United States Patent [19]

Pinske, Jr.

[11] Patent Number: 5,339,538
[45] Date of Patent: Aug. 23, 1994

[54] FLUID BED MATERIAL TRANSFER METHOD

[75] Inventor: Edward E. Pinske, Jr., Akron, Ohio

[73] Assignee: The Babcock & Wilcox Company, New Orleans, La.

[21] Appl. No.: 103,366

[22] Filed: Aug. 9, 1993

Related U.S. Application Data

[62] Division of Ser. No. 729,277, Jul. 12, 1991, Pat. No. 5,243,770.

[51] Int. Cl.$^5$ ............................................. F26B 3/08
[52] U.S. Cl. ........................................ 34/370; 34/589;
110/245; 422/142; 137/265; 365/101
[58] Field of Search ................... 34/10, 57 R, 57 A;
110/245; 422/142, 145; 122/4 D; 165/104.16,
104.18; 137/265; 285/20, 41, 226, 187; 366/101,
106, 107, 3; 432/58

[56] References Cited

U.S. PATENT DOCUMENTS

| | | | |
|---|---|---|---|
| 2,506,293 | 5/1950 | Copeland | 285/187 |
| 2,667,448 | 1/1954 | Munday | 422/142 |
| 3,299,947 | 1/1967 | Boucraut et al. | 34/57 R |
| 3,807,090 | 4/1974 | Moss | 122/4 D |
| 3,921,590 | 11/1975 | Mitchell et al. | 110/245 |
| 4,338,283 | 7/1982 | Sakamoto et al. | 422/145 |
| 4,815,418 | 3/1989 | Maeda et al. | 110/245 |
| 4,817,563 | 4/1989 | Beisswenger et al. | 110/245 |
| 4,838,581 | 6/1989 | Oda et al. | 285/187 |
| 4,864,944 | 9/1989 | Engström et al. | 34/57 A |
| 4,982,511 | 1/1991 | Frei | 34/10 |

*Primary Examiner*—Denise Gromada
*Attorney, Agent, or Firm*—Robert J. Edwards

[57] ABSTRACT

A fluidized bed apparatus comprising a pair of separated fluid bed enclosures, each enclosing a fluid bed carried on an air distributor plate supplied with fluidizing air from below the plate. At least one equalizing duct extending through sidewalls of both fluid bed enclosures and flexibly engaged therewith to communicate the fluid beds with each other. The equalizing duct being surrounded by insulation which is in turn encased by an outer duct having expansion means and being fixed between the sidewalls of the fluid bed enclosures.

4 Claims, 1 Drawing Sheet

FLUID BED MATERIAL TRANSFER METHOD

This application is a division of application Ser. No. 07/729,277, filed Jul. 12, 1991, now U.S. Pat. No. 5,243,771.

FIELD AND BACKGROUND OF THE INVENTION

The present invention relates in general to fluidized bed systems, and in particular to a new and useful apparatus and method of transferring fluidized material between two separated fluid beds, for the purpose of substantially equalizing the level and quantity of bed material and pressure differential across the beds.

A fluid bed consists of a stream of air flowing upward through a dense bed of solid particles, at sufficient flow rate to suspend and mix the particles. At sufficiently high flow rate, bubbles of air are formed in the bed, causing a highly turbulent mixing of particles and air. The appearance is that of a boiling fluid and such a bed is referred to as a "bubbling bed".

At even higher gas flow rates, the particles become entrained in the air and combustion gas stream and are transported upwardly. The particles may be collected and then returned to the process. This is known as a "circulating fluidized bed".

The fluid bed is confined within an enclosure and is supported on an air distribution means such as a distributor plate in the enclosure. The air distributor may be perforated to admit air to the bed. Below the air distributor is a means of supplying fluidizing air such as an inlet plenum which is supplied with fluidizing air at a sufficient flow rate to fluidize the particles above the air distributor plate.

Fluid beds have been used for the combustion of coal and low grade fuels. An inert or reactive bed material, for example, sand or limestone, is suspended in a fluid bed. The material is then heated to the temperature required for the ignition of coal. Crushed and sized coal is then supplied into the bed for burning. The combustion temperature is generally held within the range of 1,500° F. to 1,600° F. While the reaction temperature can locally exceed 3,000° F., a heat sink is provided in the bed for cooling the bed material to its operating temperature. This is done to keep the temperature below the softening temperature of ash (about 2,000° F.) so as to avoid clogging and other problems during operation of the bed.

Fluidized bed combustors can be operated either at atmospheric pressure (atmospheric bed) or at elevated pressure (pressurized bed).

For pressurized operation, the fluid bed enclosure is normally positioned within a pressure vessel.

It is often useful to provide more than one fluid bed enclosure. This can increase the efficiency at which fuel is burned in the fluid bed. Problems may arise however in equalizing the level and quantity of bed material and pressure differential across the beds of separate enclosures.

U.S. Pat. No. 3,893,426 to Bryers discloses a divided fluid bed enclosure where part of the enclosure confines coarse grained fuel while the other part confines fine grained fuel. Openings are provided in the partition wall to allow communication between the two fluid beds.

U.S. Pat. No. 4,457,896 to Kono discloses a fluid bed enclosure having a plurality of vertically spaced beds where material from adjacent beds can be transferred by vertically extending tubes.

Neither of these references discloses structure which can establish communication between the fluid beds of entirely separate enclosures, while compensating for differences in expansion and contraction of the enclosures.

SUMMARY OF THE INVENTION

The present invention comprises an apparatus for, and a method of establishing a communication between separate fluid beds held in separate enclosures while compensating for differences in expansion and contraction of the enclosures.

According to the present invention, one or more equalizing ducts or pipes are flexibly engaged to each of the fluid bed enclosures and extend between the enclosures. The flexible engagement accommodates the expansion and contraction of the enclosures. The duct establishes communication between the fluid beds of two separate enclosures, just above their respective air distribution devices. Each of the enclosures also includes a means of supplying fluidized air to the distribution devices, such as a plenum, for supplying fluidizing gas, preferably air, to the fluid bed.

A means of assisting material flow in the equalizing duct such as air may also be provided. The duct may be connected to the enclosure by mechanical device or air supply pipes. In this way material can be exchanged between the fluid beds through the duct. This method permits high temperature bed material to be transferred from one fluid bed to another while maintaining nearly equal or the same level and quantity of bed material and pressure differential across the two beds.

The portion of the duct situated between the enclosures is covered by insulation which is in turn surrounded by a casing connected to the enclosures. The casing is formed with circumferential folds in the shape of bellows to compensate for differences in expansion and contraction of the enclosures.

Sleeves are provided through the walls of each of the enclosures for flexible engagement with respective ends of the duct. The central portion of the duct may be fixed to the enclosure by mechanical devices to act as a zero expansion point.

Accordingly, the present invention provides a fluidized bed apparatus which comprises at least two separated fluid bed enclosures, each defining a combustion chamber and each having a distribution system for supporting a fluid bed and for passing air to fluidize the bed, and a means for supplying fluidizing air to the bed. One or more equalizing ducts extend between the enclosures to connect one fluid bed chamber with the other thereby allowing for passage of material between the beds. The equalizing ducts are flexibly engaged with the enclosures and the casing is fixed to the enclosures. The casing is provided with circumferential folds to accommodate expansion and contraction of the enclosures. The space between the duct and the casing is filled with insulation. The duct may include a means for assisting material flow.

The level and quantity of bed material and pressure differential across the fluid beds situated in separate enclosures is equalized by connecting the beds with ducts which permit and may have means of promoting movement of material between the enclosures.

DESCRIPTION OF THE PREFERRED EMBODIMENT

Figure 1:
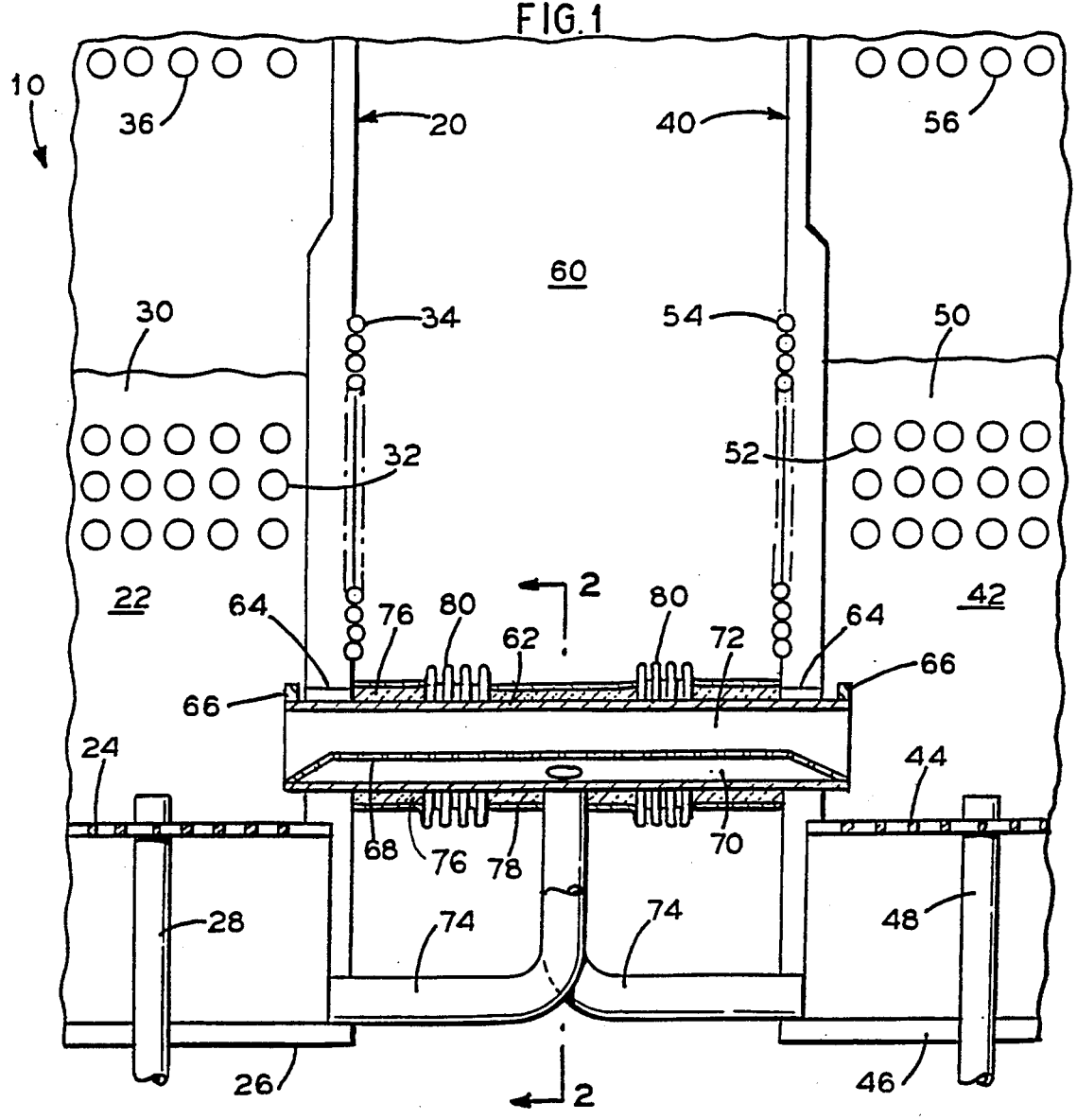
FIG. 1 is a partial side sectional view of a fluid bed apparatus of the present invention.

Referring to the drawings and particularly, the invention as embodied in FIG. 1, there is shown a fluidized bed apparatus generally designated 10 comprising a pair of separated fluid bed enclosures generally designated 20 and 40 respectively, each defining its own fluid bed chamber 22 and 42, respectively. Each enclosure further includes a plenum 26 and 46, respectively, for receiving fluidizing gas, preferably air, through an inlet (not shown). Fluidizing air, at sufficient flow rate to fluidize granular material in the chamber 22 and 42, is supplied from plenums 26 and 46 through the respective distributor plates 24 and 44. The granular material may, for example, be a mixture of inert or reactive bed material, such as sand or limestone, plus fuel such as coal which can be supplied through coal supply pipes 28 and 48 into the respective fluid bed chambers 22 and 42.

The flow of fluidizing air through chambers 22 and 42 form respective fluid beds 30 and 50 in the chambers. During combustion, the fuel and air mixture generates local temperatures up to 3,000° F. To keep the operating temperature in the chambers at around 1,500° F. to 1,600° F., heat exchangers composed of fluid-cooled tubes 32 and 52 are provided within the beds 30 and 50. For an atmospheric fluidized bed combustor, the space 60, formed between the enclosures 20 and 40, is at ambient pressure (one atmosphere) and at a temperature of about 100° F.

The fluid bed enclosures 20 and 40 may be lined in the fluid bed chamber regions, and may employ membrane tube walls 34 and 54. The membrane tube walls are fluid-cooled to maintain a tube temperature of about 700° F.

The operating conditions for a pressurized fluidized bed combustor are the same except that the space 60 is pressurized and at a temperature of about 600° F. To establish pressurization, the entire fluidized bed apparatus 10 may be disposed within a pressure vessel. Pressurized combustors can be used for operating turbines and the like.

In the case of both atmospheric and pressurized fluidized bed combustors, the space above the fluid beds 30 and 50 may also include additional heat exchangers 36 and 56 for extracting additional heat from the combustion gases.

In accordance with the present invention, and for the purpose of equalizing the level and pressure between the fluid beds 30 and 50, there are provided one or more equalizing ducts 62 which are slidably received within sleeves 64 in the walls of each of the fluid bed enclosures 20 and 40. Retainer clips 66 are provided at the opposite ends of duct 62 to retain the ends of the duct in the sleeves 64, in case of excessive contraction or misalignment of the duct 62.

The space within equalizing duct 62 may also house a means for supplying fluidizing air within the duct, such as a perforated plate 68, to promote movement of material. Fluidizing air may be supplied to the duct by a pair of conduits 74 which may be individually fixed to and have respective ends communicating with the interior of plenums 26 and 46. The other ends of conduits 74 may be fixed to and communicate with the duct 62 midway along the length of the duct. This, or some other mechanical means, may act as a zero expansion point for duct 62 as its opposite ends slide within sleeves 64.

Conduits 74 supply fluidizing air from the plenums 26 and 46, and may also tend to equalize the pressure of the air as it is supplied to the plenum space 70. Fluidized material can transfer from one fluid bed to the other across the upper fluidized material space 72 of duct 62. This material is maintained in a fluidized state because of the supply of the fluidizing air through the perforated plate 68.

Insulation 76 covers the portion of duct 62 situated between the enclosures 20 and 40. The insulation 76 is in turn covered by the casing 78 which has its opposite ends fixed to the walls of the enclosures 20 and 40, for example, by welding. The casing 78 is formed with circumferential folds or bellows 80 to accommodate expansion and contraction of the enclosures 20 and 40. Thus, according to the present invention, the equalizing duct is able to withstand wide temperature differences, for example, during operation the interior of duct 62 will be at a temperature of between 1,500° F. and 1,600° F., which is the temperature of the fluidized beds. The temperature in space 60 could either be about 100° F. (for an atmospheric combustor) or about 600° F. (for a pressurized combustor). The wall temperature of the enclosures 20 and 40 could be at about 700° F. in either case.

Despite extreme differences of temperature, the present invention operates effectively to produce nearly equal or the same level and quantity of bed material and pressure differential across the beds 30 and 50 situated in separated fluid bed enclosures.

Figure 2:
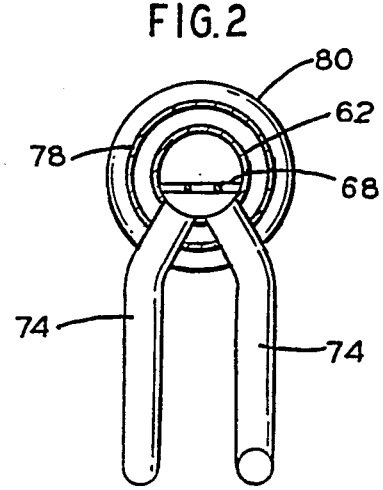
FIG. 2 is a sectional view taken on line 2—2 of FIG. 1.

FIG. 2 shows how conduits 74 extend through and connect with the duct and casing 62 and 78. The conduits 74, or some other mechanical means, may be welded both to the duct 62 and to the casing 78, to stabilize the midpoint of the duct and casing.

While in accordance with the provisions of the statutes, there is illustrated and described herein specific embodiments of the invention, those skilled in the art will understand that changes may be made in the form of the invention covered by the claims, and certain features of the invention may sometimes by used to advantage without a corresponding use of the other features.

The embodiments of the invention in which an exclusive property or privilege is claimed are defined as follows:

1. A method of equalizing material and pressure of a pair of separated fluid beds in a pair of separated fluid bed enclosures, each having distributor means for supporting its fluid bed, a sidewall extending above the distributor means, and means disposed below the distributor means for supplying fluidizing gas to the distributor means, comprising establishing communication between the fluid beds and through at least one equalizing duct extending above and adjacent to the distributor means for receiving material for movement between the fluid beds, fixing a midpoint of the equalizing duct and permitting opposite ends of the equalizing duct to slide with respect to the sidewalls of the fluid bed enclosures to accommodate expansion and contraction of the equalizing duct with the midpoint of the equalizing point acting as a zero expansion point.

2. A method according to claim 1 including connecting the midpoint of the equalizing duct to conduits and connecting the conduits to the plenums of the fluid bed enclosures for supplying the fluidizing gas to said equalizing duct.

3. A method according to claim 1 including covering the equalizing duct with an outer duct which is fixed between the fluid bed enclosures and providing expansion means in the outer duct for allowing expansion and contraction of said outer duct.

4. A method according to claim 3 including providing insulation between said equalizing and outer ducts.

* * * * *